United States Patent [19]

Klein

[11] 4,142,317

[45] Mar. 6, 1979

[54] FISHING ROD WITH LINE GUIDES THEREON AFFIXED BY MANUFACTURED ROD WRAPS

[76] Inventor: Gerald B. Klein, 13451 Stuart Ct., Broomfield, Colo. 80020

[21] Appl. No.: 763,933

[22] Filed: Jan. 31, 1977

Related U.S. Application Data

[60] Division of Ser. No. 675,822, Apr. 12, 1976, Pat. No. 4,035,454, which is a continuation of Ser. No. 516,034, Oct. 18, 1974, abandoned.

[51] Int. Cl.² ............................................. A01K 87/04
[52] U.S. Cl. ........................................................ 43/24
[58] Field of Search ............................................ 43/24

[56] References Cited

U.S. PATENT DOCUMENTS

| 3,171,229 | 3/1965 | Shobert | 43/24 |
| 3,400,481 | 9/1968 | Christenson | 43/24 |
| 3,760,524 | 9/1973 | Butler, Jr. et al. | 43/24 |
| 3,769,736 | 11/1973 | Nydam | 43/24 |
| 4,035,454 | 7/1977 | Klein | 43/24 X |

*Primary Examiner*—Clifford D. Crowder
*Attorney, Agent, or Firm*—Dennis O. Kraft

[57] ABSTRACT

Wraps to hold line guides on a flexible fisherman's rod are formed as sleeve-like units of a resilient polymer material which exhibits the characteristic properties of being capable of being elastically stretched, fixed in its stretched state by lowering the temperature thereof below normal room temperature whereby the elasticity is lost, and subsequently returned towards its original unstretched state by being allowed to warm towards normal room temperature such that the elasticity thereof is regained. The sleeve-like wrap is radially expanded and elastically stretched so as to increase its inside diameter to a diameter greater than the diameter of the rod. While in an expanded state, the temperature of the rod wrap is lowered sufficiently to cause the rod wrap to lose its elasticity and remain in a fixed and expanded state. The rod wrap is then placed about the fishing rod and over at least a portion of the line guide or other rod implement to be attached to the rod. As the rod wrap warms sufficiently to regain its elasticity, it contracts and tightly grips the rod and the rod implement in a tensioned condition to secure the line guide or rod implement tightly in place on the rod.

8 Claims, 11 Drawing Figures

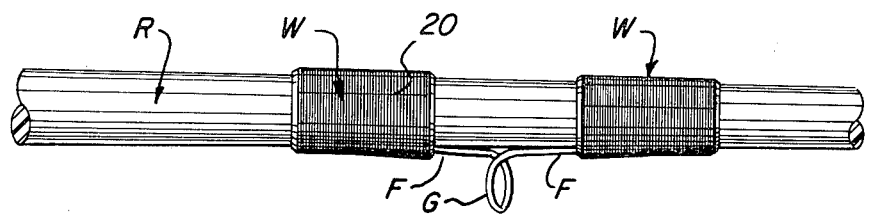
Fig_1
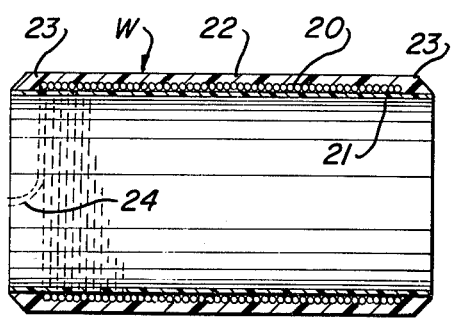
Fig_2
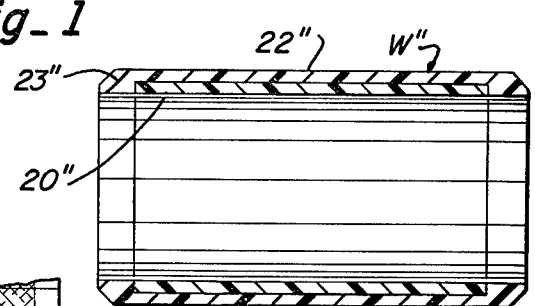
Fig_3
Fig_2a
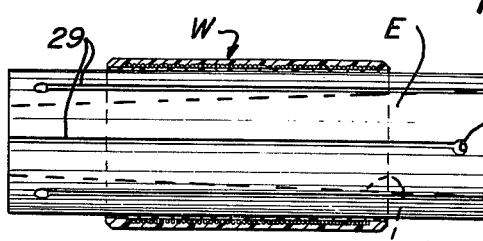
Fig_4
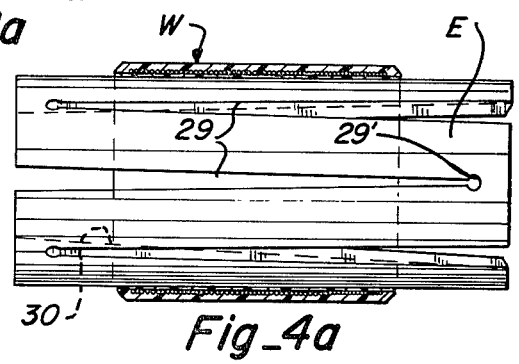
Fig_4a
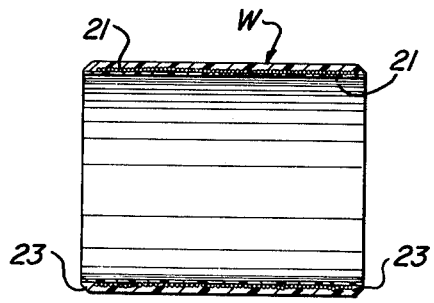
Fig_4b
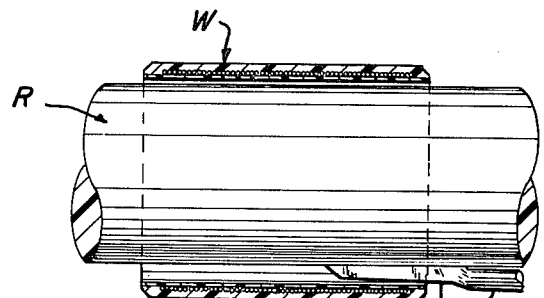
Fig_4c
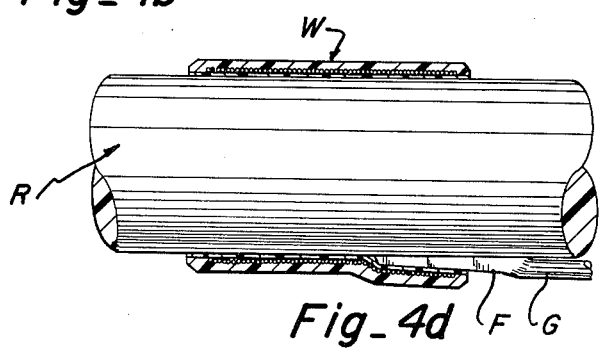
Fig_4d
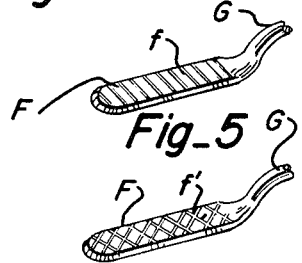
Fig_5
Fig_5a

FISHING ROD WITH LINE GUIDES THEREON AFFIXED BY MANUFACTURED ROD WRAPS

RELATED APPLICATION

This application is a Divisional of Application Ser. No. 675,822 filed Apr. 12, 1976, now U.S. Pat. No. 4,035,454 issued July 12, 1977, which application was a Continuation of Application Ser. No. 516,034 filed Oct. 18, 1974, now abandoned.

BACKGROUND OF THE INVENTION

The present invention relates to fishing rods, and more particularly is concerned with the provision of a fishing rod having line guides or other rod implements affixed thereto by rod wraps instead of thread windings.

Conventionally, a fishing rod is provided with line guides spaced along the reach of the rod and a line eye, the tip top, at the end of the rod to extend the line along the rod when it is in use. These line guides may be eyelets or simple wire loops having suitable opposing flattened ends or feet, which lie against the rod and are held in place by wraps of thread about the rod. Such a wrap is usually formed by winding a nylon thread or other thread about the rod and upon the foot of a line guide with turns of the thread lying side by side in a neat appearing arrangement. The thread is held tight during the wrapping and the pressure of the resulting wrap tightly holds the line guide in place. After such a wrap has been wound upon a rod, it is covered by one or more protective coats of a high quality varnish, resin or lacquer. In addition to the rod wraps which hold the line guides in place, other short wraps may be spaced along the rod to reinforce rod ferrules, to secure other implements such as hookkeepers, and to improve the appearance of the rod.

The wrapping of fishing rods is a manual operation requiring a high degree of skill and often it takes several years of experience before an operator can attain suitable skill and sufficient speed to be productive. Thus, these rod wrapping operations are expensive and amount to a substantial portion of the cost of the rod. With the present turbulent labor situation, a real problem exists in finding, training and hiring and keeping good wrappers. As a result, various expedients have been proposed to mechanize wrapping operations or to find a suitable substitute for such wraps. For example, it has been suggested that a plastic sleeve could be used as a substitute for a wrap and such a sleeve could be fitted upon a rod by heat shrinking so that it will attain sufficient tightness as to hold it in place. This desirable result has not been attained and sleeves of this type have not proved workable in practice in that it has been found that a sleeve of a type of plastic suitable for a shrink fit and which can be shrunk into place by heat will not have sufficient strength to hold a line guide in place and will not grip the rod with sufficient tightness so as to prevent it from slipping. Similar considerations would apply to those materials capable of being chemically dilated and then "shrunk" through solvent evaporation. A rod wrap must grip the rod and the foot of a guide so tightly and with such a degree of firmness that neither the wrap nor the foot under it will slip or otherwise move even when the rod is abused.

A glueing of a rod wrap in place has been proposed but the materials forming a rod will not easily accept a glue, or adhesive, and again tight gripping of the rod is not attained. Moreover, it is desirable that a rod wrap have a slight degree of flexibility on the rod, although not so much flexibility as to detract from the firmness of the connection. Accordingly, most rods manufactured today still are hand wrapped even though the operation is expensive, and labor problems limit the production of such rods.

SUMMARY OF THE INVENTION

It is thus apparent that a need still exists in this art for the provision of a mechanism and/or technique of affixing line guides or other rod implements to a flexible fishing rod by which the necessity of tedious hand wrapping is eliminated. It is the primary objective of the instant invention to provide such a technique and mechanism by which this need is satisfied.

A further and more specific objective of the instant invention relates to the provision of a novel and improved sleeve-like wrap which may be fitted upon a fishing rod to hold a line guide or other rod implement tightly upon the rod. Another objective of the instant invention is the provision of a novel and improved sleeve-like rod wrap which can be produced at a very low unit cost and which will significantly reduce the cost of production of fishing rods.

Yet another objective of the instant invention relates to the provision of a sleeve-like rod wrap which quickly affixes line guides to the fishing rod by means of simple and easily performed steps that result in an exceedingly tight fit of the wrap on the rod.

Yet another objective of the instant invention is the provision of a sleeve-like wrap for a fishing rod which is so constructed so as to eliminate the necessity of conventional varnishing operations and which further is neat appearing, economical, strong, tough, and capable of withstanding considerable abuse.

These objectives as well as others which will become apparent as the description proceeds are implemented by the instant invention which contemplates the utilization of a sleeve-like rod wrap which serves to securely attach a line guide or other relatively rigid rod implement to a flexible fishing rod. The sleeve-like rod wrap has an inside diameter at normal room temperature which is less than the diameter of the fishing rod and is formed of a resilient polymer material, such as nylon, which exhibits the characteristic properties of being capable of being elastically stretched, fixed in its stretched state by lowering the temperature thereof below normal room temperature whereby the elasticity is lost, and subsequently returned towards its original unstretched state by being allowed to warm towards normal room temperature such that the elasticity thereof is regained. In alternative embodiments of the sleeve-like rod wrap of the instant invention, the wrap could contain a winding of a selected thread embedded within the sleeve, or the rod wrap could additionally be encased in a tough resin coating of elastomeric plastic.

The rod wrap is radially expanded and elastically stretched so as to increase its inside diameter to a diameter greater than the diameter of the rod. The temperature of the expanded rod wrap is then lowered sufficiently to cause the rod wrap to loose its elasticity and remain in a fixed and expanded state. The rod wrap, for example, could be "frozen" through the application of a cooling medium thereto.

While the rod wrap is "fixed" in its expanded state, and before the wrap has warmed sufficiently to regain its elasticity, the rod wrap is physically placed about the rod and over at least a portion such as the foot, of a line guide or other rod implement to be attached to the fishing rod. Thereafter, the rod wrap, as it warms toward normal room temperature and regains elasticity, will contract and tightly grip the rod and the rod implement in a tensioned condition to secure the rod implement to the rod. The necessity for tedious hand wrapping of a line guide to a fishing rod is thereby entirely eliminated.

BRIEF DESCRIPTION OF THE DRAWINGS

The invention itself will become better understood and further features and advantages thereof will become apparent from the following detailed description of several preferred embodiments, such description making reference to the appended sheet of drawings, wherein:

FIG. 1 illstrates a fragment of a fishing rod with a line guide thereon being held by rod wraps constructed and applied in accordance with the principles of the invention;

FIG. 2 is a longitudinal sectional view of one type of rod wrap constructed according to the invention but illustrated on a greatly enlarged scale;

FIG. 2a is a fragmentary sectional view similar to a portion of FIG. 2, but illustrating a modified mode of thread wrapping;

FIG. 3 is a longitudinal sectional view similar to the showing at FIG. 2, but illustrating a modified form of a rod wrap;

FIG. 4 is a diagrammatic sectional view of a rod wrap formed as a unitary member which may also represent wraps illustrative of a first step of a sequence of applying the wrap to a fishing rod in accordance with the invention;

FIG. 4a is a diagrammatic view similar to FIG. 4 but illustrating the expander as being expanded to enlarge the diameter of the rod wrap;

FIG. 4b is a diagrammatic view of the enlarged rod wrap of FIG. 4a after it has been cooled and with the expander removed;

FIG. 4c is a diagrammatic view of the enlarged, cooler or frozen rod wrap fitted upon a rod with the foot of a line guide being in place;

FIG. 4d is a diagrammatic view similar to FIG. 4c but after the rod wrap has warmed to ambient temperature and has shrunk upon the rod; and FIG. 5 is an enlarged fragmentary perspective view showing the foot of a line guide to be placed under a wrap, having a serrated surface thereon.

FIG. 5a is similar to FIG. 5 but depicts a knurled surface on the foot.

DETAILED DESCRIPTION OF PREFERRED EMBODIMENTS

Referring first to FIG. 1 of the drawing, a pair of the improved wraps W which comprise sleeve-like members are fitted upon a rod R to hold the opposing feet F of a line guide G. The general appearance of these wraps is that of conventional hand wrappings and it is essential that they fit very tightly about the rod, with the foot portions F of the line guide being extended underneath each wrap, as illustrated. In one embodiment of a wrap, each wrap is formed as a tight winding of thread 20. Conventionally, the thread is wound directly upon the rod, and in a preferred embodiment, the thread is wrapped upon a thin inner sleeve 21. The thread 20 is also within an outer cover 22 so that the sleeve 21 and outer cover fully embed the thread. Preferably, this thread 20 is of nylon as is the inner sleeve 21 and outer cover 22. The diameter of this wrap W, when it is first formed, will be established by the diameter of the rod R at the point where the wrap is to be placed, and the inside diameter of a wrap W will be measurably less than the rod diameter at that point in order to produce a tight fit of the wrap upon the rod, as hereinafter described. Other proportions of the wrap, its thickness and length, may be varied. The wrap may be of any selected length and the thickness will depend upon the diameter of the thread and the amount of plastic used for the sleeve 21 and cover 22, which sleeve 21 and cover 22 preferably is transparent. While the wrap may be formed by winding a length of thread upon the inner sleeve 21, as a continuous wind about the sleeve, a wrap W' may also be formed by weaving thread upon the sleeve 21 as indicated at 20' at FIG. 2a. In either arrangement, a short reach of the plastic cover 22 extends beyond the wrapped thread at each end of the wrap to provide for a neatly finished edging 23, and also to better contain one or more ends 24 of the thread wrapping, as hereinafter further described.

Although a nylon thread 20 is preferred, other strong fiber materials of synthetic resin plastics can be used. The plastic materials 21 and 22 which embed this thread are preferably tough, thermoplastic types of resilient polymers such as nylon. Other materials which might be used to form this wrap W, must have similar characteristics to nylon in that such materials must have a sufficient toughness, hardness and relative inflexibility to insure a relatively immovable connection, yet have sufficient resilience as to permit them to be stretched, and they must further be capable of being fixed by cooling while in a stretched state at least for a short period of time. It is believed that the stretching action may be either a resilient or an elastomeric phenomenon of a type commonly observed in many synthetic resins. The basic feature of the stretching action herein considered resides in the fact that the resin may be stretched, or expanded, and then remain in a stretched, or expanded state for a time period while cooled before recovery, that is, before returning to, or approximately to, the initial unstretched state. This is accomplished by lowering the temperature of the material sufficiently to cause the rod wrap to lose its elasticity by chilling below ambient or room temperature and in some cases, to cryogenic temperatures. This cooling operation will be hereinafter referred to as "freezing". When so frozen, the plastic resins suitable for the purpose at hand will regain their elasticity and tend to return to their original state once the materials warm toward normal room temperature.

A rod wrap may alternatively be formed without the use of thread. As exemplified at FIG. 3, a modified wrap W'' includes an inner, cylindrical sleeve 20'' of a strong, resilient plastic material, such as nylon, which is suitably encased within a plastic, outer cover 22'' of a clear, tough, wear-resistant material, such as polyurethane or other elastomers. The modified wrap W'' is also formed with a short portion of the cover 22'' extending beyond each end of the sleeve 20'' as an edging 23'' to improve the appearance of the unit. Also, if the cover 22'' is transparent, the sleeve 20'' may be of a selected color and surface texture to provide for a distinctive unit. A further modified, simplified wrap can desirably be utilized and can consist of a cylindrical sleeve of a single resilient polymer material such as nylon having the previously discussed characteristic properties.

Such unitary or two-piece, or even the threaded wraps, may be formed by several conventional processes such as by extrusion or by injection molding processes. The rod wrap may also be formed without the inner sleeve 21 by coating the thread with an elastomeric plastic such as polyurethane, and the wraps of the thread in this case may then be fused together, either before or when the outer cover 22 is applied by extrusion or in any other manner, such as by injection molding or spraying. Also, in injection molding, the pressure may be such as to force the plastic forming the outer cover 22 into and through the interstices of the thread fibers. In either case, the fusion operation of the coating on the adjacent wraps or high pressure injection molding will form the equivalent of the inner sleeve 21, if such a sleeve is not provided in advance of forming the cover 22.

It is essential that the wraps W and W' be fitted upon a fishing rod with an exceedingly tight fit which is comparable to that which can be attained when a thread is wrapped about a rod in a conventional manner. In accordance with the preferred mode of practicing the present invention, to attain this very tight fit, the wrap W is forcibly radially expanded or stretched to a size greater than the diameter of the fishing rod at the point where the wrap is to be placed. Once expanded, the temperature of the wrap is lowered sufficiently to cause the wrap to lose its elasticity such that it will not immediately return towards its initial size, although it will do so upon warming back toward normal room temperature. The lowered temperature will depend upon the plastic materials forming the wrap, and a suitable low temperature for a given resin can be easily determined by simple experiments. For example, temperatures which can be obtained by commercially available conventional refrigeration were found to be sufficient in many cases although cryogenic temperatures (as might be obtained by using liquid nitrogen) may be preferable to extend the time before the wrap warms.

Thereafter, the "frozen" wrap is fitted upon the fishing rod, with the foot of a guide being placed underneath it at a proper position. The wrap is then allowed to warm to ambient or normal room temperature. Responsive to this warming, the wrap regains its natural elasticity to contract to its original size, or nearly so, and to grip the rod and a line guide foot F with an exceedingly tight fit, for the initial size of the wrap will be somewhat less than the diameter of the rod at the point where the wrap is to be placed, as heretofore mentioned.

This sequence of operations is diagrammatically illustrated at FIGS. 4, 4a, 4b, 4c, and 4d. The expansion of the wrap W to an increased diameter may be accomplished with any suitable tool, and a conventional expander E may be used for this purpose. The expander E, as illustrated, is a simple cylindrical tube having a circumferential array of longitudinal slots 29 in the walls, each of which commences at a hole 29' near one end of the tube and with the slots being oppositely directed from adjacent slots in an alternating manner as illustrated in the figure. The passageway through the tube is a tapered core 30 extending through the expander E. When a taper pin, not shown at FIGS. 4 and 4a, which corresponds to the tapered core 30 of the expander, is driven into the expander the slots will spread apart, as illustrated at FIG. 4a, to increase the diameter of the wrap W. The wrap, the expander and the pin may then be subjected to a reduced temperature such as with carbon dioxide or the like to freeze the wrap. When the wrap is frozen, the pin may be removed from the expander E to permit it to contract and then be removed from the wrap to leave a frozen, expanded wrap W as shown at FIG. 4b. Thereafter, the frozen wrap W is placed upon a fishing rod R with the foot F of a guide G in place, as shown at FIG. 4c. As the wrap warms, it reduces in size to tightly grip the rod and foot as shown at FIG. 4d. For a better fit and a tighter gripping of the foot by the wrap, the upper surface of a foot may be corrugated as shown at f at FIG. 5 or even knurled as at f' as shown at FIG. 5a. Such corrugations are not possible with conventional wraps because they will cut the threads of the wrap; accordingly a much better gripping of the foot is possible than with conventional thread wraps.

The frozen wrap may be stored in its frozen state for a substantial time period, then placed or fitted on a rod, and thereafter will return to, or nearly to, its initial size upon thawing.

It should now be apparent that the objectives set forth at the outset of this Specification have been successfully achieved.

Accordingly, what is claimed is:

1. In combination with a flexible fishing rod and a relatively rigid rod implement, a tubular ring disposed about the fishing rod and over at least a portion of a relatively rigid rod implement in a tensioned and contracted condition to secure the rod implement to the rod, said ring having an inside diameter at normal room temperature less than the diameter of the rod and being formed of a resilient polymer material, said material being of the type which exhibits the characteristic properties of being capable of being elastically stretched, fixed in its stretched state by lowering the temperature thereof below normal room temperature whereby the elasticity is lost, and subsequently returned towards its original unstretched state by being allowed to warm toward normal room temperature such that the elasticity thereof is regained.

2. The apparatus as defined in claim 1, wherein said rod wrap is formed of nylon.

3. The apparatus as defined in claim 1, wherein said rod wrap is formed as a multi-layered sleeve.

4. The apparatus as defined in claim 1, wherein said rod wrap includes a wound thread in said sleeve of resilient polymer material.

5. The apparatus as defined in claim 4, wherein said sleeve of resilient polymer material includes an inner sleeve portion and an outer cover portion with the two portions joining together at each end of the rod wrap and extended a short distance beyond the thread winding to form an edging portion at each end of the rod wrap.

6. The apparatus as defined in claim 5, wherein the winding of thread forms a tight, helix pattern with the end of the thread at each end of the winding extending away from the winding and being embedded in the aforesaid edging portion.

7. The apparatus as defined in claim 1, wherein said rod wrap includes woven threads embedded in said sleeve of resilient polymer material.

8. A flexible fishing rod having a given outside diameter, a relatively rigid rod implement for attachment to said fishing rod, and means for attaching said implement to said rod, said means comprising a tubular ring integrally composed of a solid piece of nylon, said ring having an inside diameter smaller than said given outside diameter of said fishing rod and being disposed in a tensioned condition about the fishing rod and over at least a portion of the relatively rigid rod implement.

* * * * *